United States Patent [19]

Spulgis

[11] Patent Number: 5,181,275
[45] Date of Patent: Jan. 26, 1993

[54] APRON TO BE USED IN A SEATED POSITION

[76] Inventor: Edwin A. Spulgis, 1814 Second Dr., Charleston, S.C. 29407

[21] Appl. No.: 794,948

[22] Filed: Nov. 20, 1991

[51] Int. Cl.⁵ .................... A41B 13/10; B60R 7/00
[52] U.S. Cl. ........................................ 2/48; 2/49 A; 224/275
[58] Field of Search .............. 2/2, 46, 48, 49 R, 49 A, 2/50, 51, 52; 108/43, 44; 224/275, 273

[56] References Cited

U.S. PATENT DOCUMENTS

| | | | |
|---|---|---|---|
| 2,640,595 | 6/1953 | Byford | 224/275 X |
| 3,361,091 | 1/1968 | Inman | 108/43 |
| 4,660,224 | 4/1987 | Ashcraft | 2/48 |
| 4,721,216 | 1/1988 | Kinder | 220/903 X |
| 4,801,060 | 1/1989 | Thompson | 224/275 |
| 4,832,241 | 5/1989 | Radcliffe | 224/275 |
| 5,056,159 | 10/1991 | Zemke, Jr. | 2/46 X |
| 5,069,375 | 12/1991 | Flick | 224/275 X |
| 5,075,897 | 12/1991 | Daniels | 108/43 X |

FOREIGN PATENT DOCUMENTS 314300  7/1956  Switzerland ................ 2/51

Primary Examiner—Andrew M. Falik
Assistant Examiner—Jeanette F. Chapman
Attorney, Agent, or Firm—B. Craig Killough

[57] ABSTRACT

An apron is placed in a lap of a seated wearer to protect the legs and lower torso of the wearer, and the seating surface on which the wearer is seated. The apron device is characterized by a defined cup area which allows a beverage container to be positioned in the crotch area of the seated wearer, and which aids in positioning of the device over the wearer. The device may be held in place by positioning an automotive type seat belt over the upper portion of the apron.

4 Claims, 1 Drawing Sheet

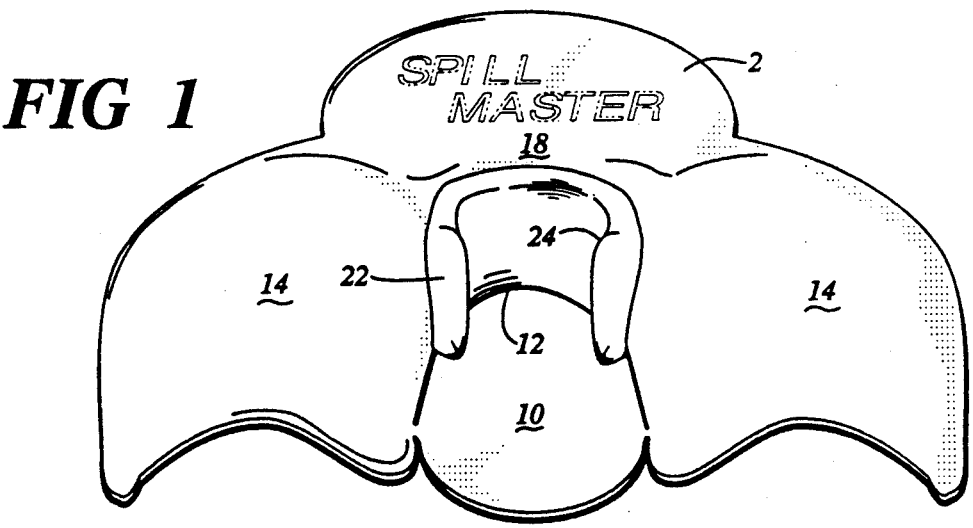
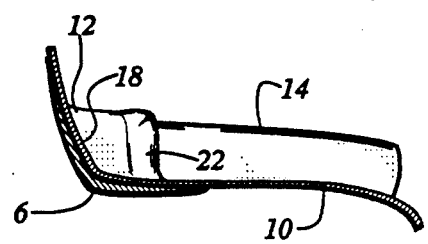
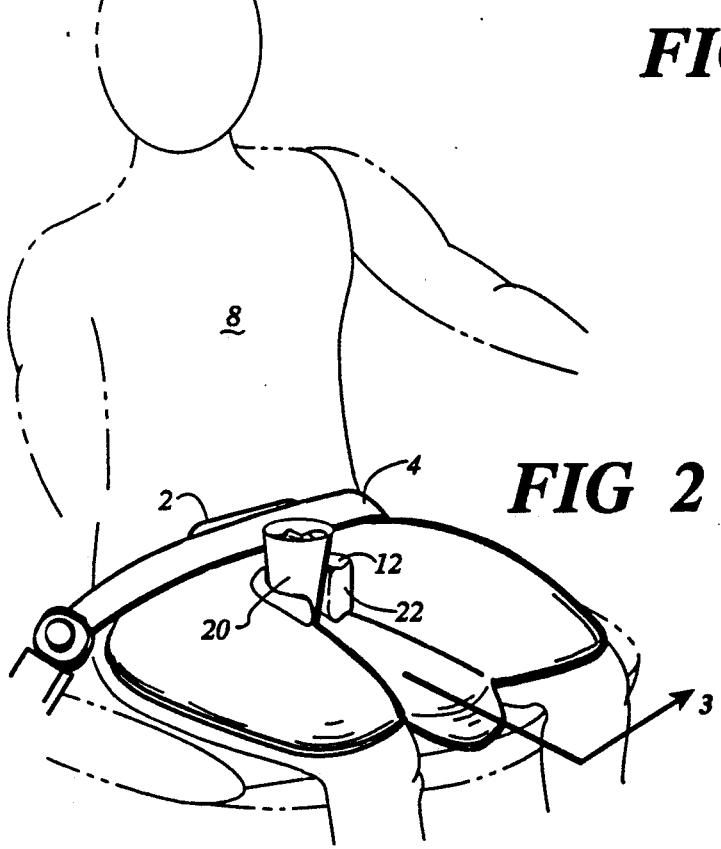

APRON TO BE USED IN A SEATED POSITION

BACKGROUND OF THE INVENTION

The present invention is an apron which may be worn while seated to protect the wearer of the apron and the wearer's clothing from food and beverage spills, and which will further facilitate the consumption of food and beverages while seated.

It is common to consume food and beverages in a seated position. Most commonly, food and beverages are consumed with a beverage container and food placed on a table, with the legs of the person consuming the food and beverage placed underneath the table. A simple cloth or paper napkin may be placed in the lap of the person consuming the food or beverage, but the presence of the table helps avoid spills.

It is very common, however, to consume food in the seated position without the benefit of a table. At parties, for example, it is common to sit in a chair, while balancing a tray of food and a beverage. The absence of a table on which to place food and drink increases the likelihood of spills, while the absence of the table eliminates the protection provided by the table.

Perhaps the most common occurrence of the consumption of food and beverages while sitting is in an automobile. In the past, when drive-in restaurants were prevalent, it was common to eat in a stationary automobile in a seated position. Now, fast food restaurants universally provide drive-through service. It has become more and more common to drive through a fast food restaurant, obtain food and drink, and eat and drink while driving. The combination of the seated position, the absence of a table, the movement of the automobile and the hand and foot motion necessary to operate the automobile result in the likelihood that consumption of food and drink while driving or riding in an automobile will result in a spill onto the clothing of the person or individual attempting to consume food and beverages while in the automobile.

While riding in a car, it is common to place a hot or cold beverage between the legs to hold it in place. The temperature of the hot or cold beverage can be uncomfortable, and further, spillage from the beverage is potentially hazardous to the person, his or her clothing, and the seating surface.

SUMMARY OF THE PRESENT INVENTION

The present invention provides an apron which extends over the legs and lap of the seated user. The apron is useful to protect the legs and lap from spills of food and beverages, and prevent clothing from becoming soiled and stained as a result of such spillage.

The apron incorporates a cup which facilitates holding a beverage between the legs. An upper extension 2 allows the lap belt 4 of a typical automotive seat belt to hold the device in place. Insulative material 6 may be incorporated into the device, particularly near the cup portion, to prevent discomfort from the hot or cold beverage held between the legs of the user.

DETAILED DESCRIPTION OF THE DRAWINGS

FIG. 1 is a frontal view of the apron showing the leg protectors 14, the cup 12, and the top extension 2.

FIG. 2 is a perspective view of the device, with the wearer shown as a phantom, indicating the use of an automotive seat belt to retain the device in place, and indicating the cup which allows a beverage to be placed between the legs of the wearer.

FIG. 3 is a side, sectioned view taken along line 3 of FIG. 2, showing the insulated material incorporated into the device.

DETAILED DESCRIPTION OF THE PREFERRED EMBODIMENT

As shown in FIG. 2, the device is placed over the legs and fits in the crotch and lap of a wearer 8. The apron covers the legs and clothing as shown. The top extension 2 rises above the leg protectors, and covers the lower torso of the wearer. The typical and standard lap belt 4 of an automotive seat belt is pulled across the top extension 2, and is used to aid in holding the apron in place.

The lap portion 10 is connected to, or continues from, the leg protectors 14 and a portion 18 of the apron which protects the lower torso. While the apron itself is extremely flexible so as to allow folding of the device and the like, in the preferred embodiment, the lap portion forms a cup 12 where the leg protectors and the lower torso protectors join the lap protector. While this cup may be formed from the same material as the remainder of the device, its construction results in a shape retention characteristic which aids in positioning the device by situating the cup within the crotch area of the seated wearer. The cup then provides a means for positioning the beverage container 20 within the device.

In the preferred embodiment the apron is molded in one piece. The apron may be constructed of any of various materials which will repel, and not absorb, liquids or food matter.

If the apron is made of a relatively flexible material, the cup will have a shape defined by the joinder of the torso protector 18, the lap protector 10, and the leg protectors 14. Insulative material 6 affixed in the cup area 12 will further form the cup, even if the remainder of the apron is made of a thin plastic sheet, or other similar flexible material.

Alternatively, the apron may be formed by other means such as the vacuum molding of plastic. The cup area may then be formed so as to readily accept the beverage container, and for placement of the cup 12 between the wearer's legs to position the device. The cup 12 could be molded plastic, or it could be formed of other materials such as foam type materials. However, the device may still be sufficiently flexible to allow the wearer to place pressure by means of the legs on the cup and the beverage container to aid in retaining the beverage container while riding in or operating a vehicle.

FIG. 3 demonstrates the formation of the cup 12. The lower torso protector 18 is joined at the lap portion 10 and the leg protecting portions 14 at the point of formation of the cup 12. The joinder of these portions from the various angles inherently provides a shape retention characteristic of the device. Insulation 6 may be provided at this point.

The cup 12 has a horseshoe shape when viewed form above, with legs extending from the semi circular back of the cup to accept the beverage container 20. The faces 22 of the cup are angled toward the interior of the cup to aid in sliding the container 20 into the cup. Lips 24 are formed on the interior edges of the faces 22 to aid in retaining the container 20 once it is positioned in the cup.

The lap protector 10 protects the lap and the seat, and channels spilled beverages to the floor and off of the seat. The leg protectors 14 may be of a patterned or "non-skid" type surface to retain food, such as sandwiches, thereon.

The device may be made of virtually any flexible plastic, vinyl, or other material, including certain paper, which will repel liquids and food materials, and greasy residues of food materials. The device may be made from known plastic materials, for example, which will sufficiently repel liquids and food materials, but which is flexible enough to allow folding of the device for storage, and is durable enough to allow the device to be reused.

In the preferred embodiment, an insulative material such as foam rubber maybe used in the cup area. If desired, the insulative material can be used to further insulate the entire surface of the device.

What is claimed is:

1. An apron which may be placed in a lap of a seated wearer so as to protect legs and lower torso of the wearer and to protect a seating surface on which the wearer is seated, comprising:
    a. a first leg protector which is placed over a leg of a wearer and which contacts a top of the leg and an inner side of the leg of the wearer;
    b. a second leg protector which is placed over a top of a remaining leg and an inner side of the remaining leg of the wearer;
    c. a torso protector which is placed over a lower torso of said wearer so as to protect a lower torso of the wearer;
    d. a lap protector which connects said first leg protector to said second leg protector by attachment or continuation of said first leg protector at a bottom of a part of said leg connector which covers the inner side of the leg and which connects to said second leg protected by continuation of said second leg protector at a bottom of a part of second leg protector which covers an inner side of the leg, wherein said lap protector has a bottom which rests against a seat upon which a wearer is seated and has a relatively flat top surface which allows a flat bottom of a beverage container to rest upon said lap protector; and
    e. a cup which is formed where said first and second leg protectors and said lap protector join at said torso protector, wherein said cup has an open side which is between said leg protectors so as to accept a beverage container within said cup through said open side, wherein said beverage container is retained within said cup between said legs of said wearer and against said torso protector, and wherein a bottom of said beverage container rests against said lap protector.

2. An apron as described in claim 1, said cup has a horseshoe shape with an open side which receives a beverage container through said open side and wherein said beverage container is retained within said cup by remaining sides of said cup, and wherein a thickness of insulative material is affixed in said horseshoe shape to said leg protectors, said lap protectors, and said torso protector.

3. An apron as described in claim 1, said cup has faces on each edge of said open side through which said beverage container is inserted which are angled toward an interior of said cup which facilitate said cup receiving said beverage container.

4. An apron described in claim 3, lips are formed in an interior edge of each of said faces to cause said container to be retained within said cup.

* * * * *